United States Patent
Murakawa

(12) 
(10) Patent No.: US 6,249,607 B1
(45) Date of Patent: Jun. 19, 2001

(54) SIMILAR-IMAGE RETRIEVING APPARATUS, SIMILAR-IMAGE RETRIEVING METHOD AND PROGRAM STORAGE MEDIUM

(75) Inventor: Akira Murakawa, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/153,850

(22) Filed: Sep. 16, 1998

(30) Foreign Application Priority Data

Sep. 19, 1997 (JP) ................................. 9-255312

(51) Int. Cl.$^7$ ........................................... G06K 9/48
(52) U.S. Cl. ................................................ 382/199
(58) Field of Search .......................... 382/199, 198, 382/200, 201, 208, 209, 218, 219, 220, 221, 280, 279, 281, 278

(56) References Cited

U.S. PATENT DOCUMENTS

| | | | |
|---|---|---|---|
| 5,325,449 | * 6/1994 | Burt et al. | 382/56 |
| 5,640,468 | * 6/1997 | Hsu | 382/190 |
| 6,014,468 | * 1/2000 | McCarthy et al. | 382/254 |

FOREIGN PATENT DOCUMENTS

| | | |
|---|---|---|
| 60-157681 | 8/1985 | (JP) . |
| 5-28266 | 2/1993 | (JP) . |
| 5-274372 | 10/1993 | (JP) . |
| 6-274193 | 9/1994 | (JP) . |
| 6-295318 | 10/1994 | (JP) . |
| 7-271949 | 10/1995 | (JP) . |
| 8-16789 | 1/1996 | (JP) . |
| 8-329096 | 12/1996 | (JP) . |

OTHER PUBLICATIONS

The Transaction of the Japanese Information Processing Society, vol. 33, No. 5.; May 1992.
Fundamentals of Image Recognition (II); Apr. 20, 1990.
Dr. Gupta, "Visual Information Retrieval Technology A Virage Perspective", Virage Image Engine API Specification, Feb. 1997.

* cited by examiner

*Primary Examiner*—Andrew W. Johns
*Assistant Examiner*—Seyed H. Azarian
(74) *Attorney, Agent, or Firm*—Burns, Doane, Swecker & Mathis, LLP

(57) ABSTRACT

A similar-image retrieving apparatus and a similar-image retrieving method allow data amount to be reduced by digitizing feature quantities of external shapes of islands extracted from images, and also allow shape comparison to be achieved by simple calculation of the digitized feature quantities. Thus, the apparatus and the method are capable of practical retrieval of similar images. A feature quantity extracting section 2 extracts an external shape of an island from image data, and determines coefficients by Fourier series expansion of point strings of edge pixels of the external shape, thereby extracting the coefficients as feature quantities of the external shape of the island. Based on the feature quantities of a key image and the feature quantities of comparative images extracted in this way by the feature quantity extracting section 2, similarities between the key image and the comparative images are calculated by a similarity calculating section 6.

15 Claims, 12 Drawing Sheets

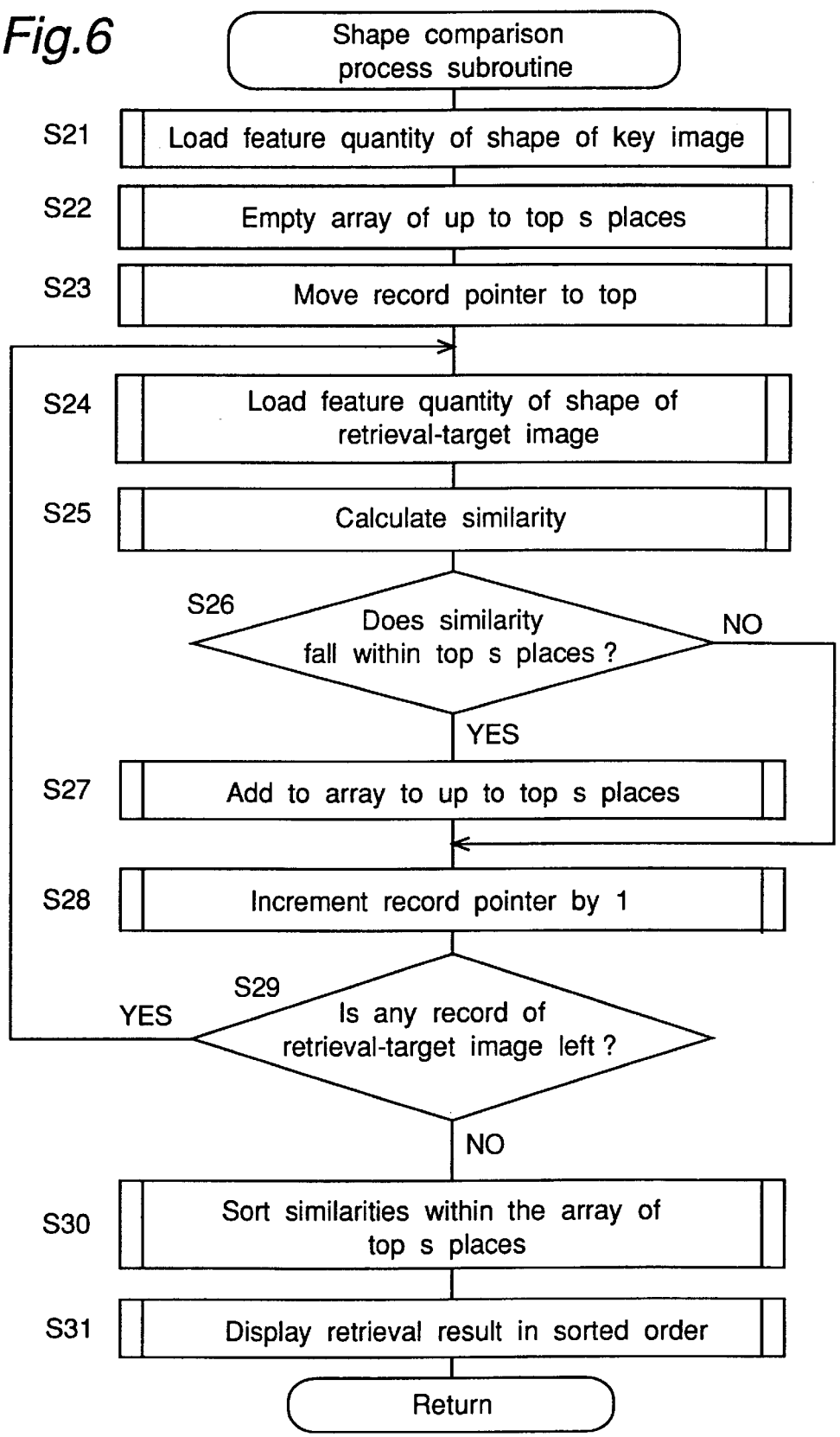

| From left side | From lower side | From right side | From upper side |
|---|---|---|---|

*Fig7B*

| Point string TL | Point string LB | Point string BR | Point string RT |
|---|---|---|---|

Feature quantities of regular dodecagon

| Order | Coefficient for positive order | Coefficient for negative order |
|---|---|---|
| 1 | 0.1573 | 0.0000 |
| 2 | 0.0000 | 0.0000 |
| 3 | 0.0000 | 0.0000 |
| 4 | 0.0000 | 0.0000 |
| 5 | 0.0000 | 0.0000 |
| 6 | 0.0000 | 0.0000 |
| 7 | 0.0000 | 0.0000 |
| 8 | 0.0000 | 0.0000 |
| 9 | 0.0000 | 0.0000 |
| 10 | 0.0000 | 0.0000 |

Fig.13

Feature quantities of regular hexagon

| Order | Coefficient for positive order | Coefficient for negative order |
|---|---|---|
| 1 | 0.1520 | 0.0000 |
| 2 | 0.0000 | 0.0000 |
| 3 | 0.0000 | 0.0000 |
| 4 | 0.0000 | 0.0061 |
| 5 | 0.0000 | 0.0000 |
| 6 | 0.0000 | 0.0000 |
| 7 | 0.0031 | 0.0000 |
| 8 | 0.0000 | 0.0000 |
| 9 | 0.0000 | 0.0000 |
| 10 | 0.0000 | 0.0000 |

Fig.14

Feature quantities of regular triangle

| Order | Coefficient for positive order | Coefficient for negative order |
|---|---|---|
| 1 | 0.1316 | 0.0000 |
| 2 | 0.0000 | 0.0329 |
| 3 | 0.0000 | 0.0000 |
| 4 | 0.0082 | 0.0000 |
| 5 | 0.0000 | 0.0053 |
| 6 | 0.0000 | 0.0000 |
| 7 | 0.0027 | 0.0000 |
| 8 | 0.0000 | 0.0021 |
| 9 | 0.0000 | 0.0000 |
| 10 | 0.0013 | 0.0000 |

Fig.15

Feature quantities of "E" shape

| Order | Coefficient for positive order | Coefficient for negative order |
|---|---|---|
| 1 | 0.0468 | 0.0274 |
| 2 | 0.0307 | 0.0061 |
| 3 | 0.0222 | 0.0132 |
| 4 | 0.0109 | 0.0187 |
| 5 | 0.0009 | 0.0008 |
| 6 | 0.0006 | 0.0014 |
| 7 | 0.0029 | 0.0015 |
| 8 | 0.0039 | 0.0017 |
| 9 | 0.0009 | 0.0007 |
| 10 | 0.0009 | 0.0006 |

Fig.16

Feature quantities of "F" shape

| Order | Coefficient for positive order | Coefficient for negative order |
|---|---|---|
| 1 | 0.0604 | 0.0256 |
| 2 | 0.0381 | 0.0128 |
| 3 | 0.0122 | 0.0269 |
| 4 | 0.0056 | 0.0028 |
| 5 | 0.0062 | 0.0007 |
| 6 | 0.0066 | 0.0028 |
| 7 | 0.0016 | 0.0011 |
| 8 | 0.0007 | 0.0010 |
| 9 | 0.0018 | 0.0009 |
| 10 | 0.0006 | 0.0008 |

Fig.17

Feature quantities of "Ш" shape

| Order | Coefficient for positive order | Coefficient for negative order |
|---|---|---|
| 1 | 0.0583 | 0.0172 |
| 2 | 0.0191 | 0.0162 |
| 3 | 0.0253 | 0.0183 |
| 4 | 0.0087 | 0.0122 |
| 5 | 0.0037 | 0.0069 |
| 6 | 0.0042 | 0.0025 |
| 7 | 0.0031 | 0.0002 |
| 8 | 0.0003 | 0.0006 |
| 9 | 0.0019 | 0.0021 |
| 10 | 0.0014 | 0.0005 |

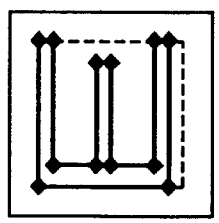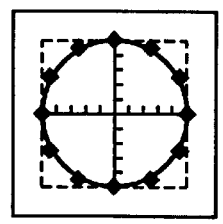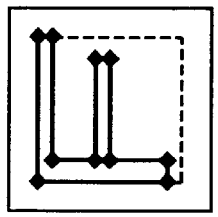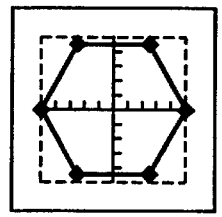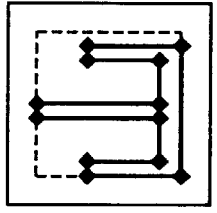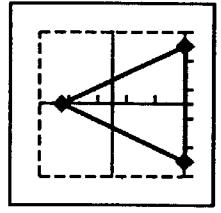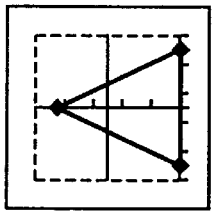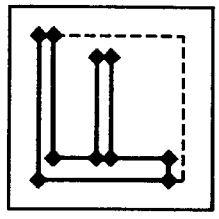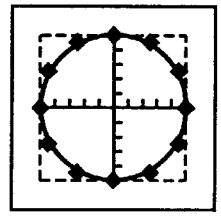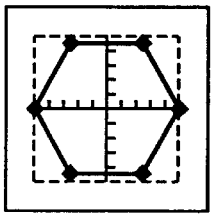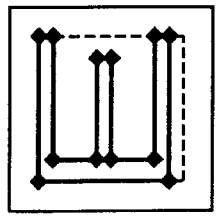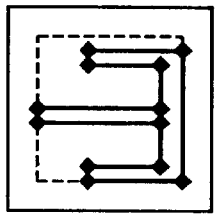
Fig.18A
Fig.18B
Fig.18C
Fig.18D

SIMILAR-IMAGE RETRIEVING APPARATUS, SIMILAR-IMAGE RETRIEVING METHOD AND PROGRAM STORAGE MEDIUM This application is based on application No. 09-255312 filed in Japan, the contents of which are hereby incorporated by reference.

BACKGROUND OF THE INVENTION

The present invention relates to a similar-image retrieving apparatus and similar-image retrieving method for retrieving similar images in image database equipment or the like, and also relates to program storage media therefor.

In recent years, with a remarkable development in the information processing field, and particularly with improvement in performance of personal computers or the like, image database equipment and electronic filing equipment have been becoming widespread not only for business use and special use but also for general users. In these equipment, an image is captured by an input device as image data, and the captured image data is stored and managed together with additional information such as a key word, and afterwards, as required, retrieved and printed by an output device. The additional information for image data includes attribute information such as preparation date, correction date, file name and file format, and key information such as key word, shape feature, hue and speech. Then, in the image database equipment or electronic filing equipment, a desired image is retrieved by specifying the attribute information and the key information, while comparison operation of image data itself is performed for retrieving an image closely similar to a particular key image.

However, in the image database equipment or the electronic filing equipment as described above, since comparison operation of the image data itself is performed for the retrieval of a similar image, a large amount of memory resources are involved in the storage of image data, while enormous memory and processing time are required for the comparison. Thus, those equipment could not be practical systems.

This being the case, there has been proposed a similar-image retrieving apparatus in which a similar image is retrieved using edge information of images ("Retrieval of image contents, Kato and Kurita", Journal of Information Processing Society, Vol. 33, No. 5). However, shape comparison by edge images in this similar-image retrieving apparatus has a disadvantage that the degree of extraction for external shape is so low that similar images having a rotated or translated external shape or having a scaled-up or scaled-down external shape could not be retrieved. Also, because the feature quantity of an extracted shape is represented by image data, large amounts of memories are required for storage of data, while large amounts of operations are involved in the retrieval of an image, so that long time would be required for retrieval, as a further problem.

SUMMARY OF THE INVENTION

Therefore, an object of the present invention is to provide a practical similar-image retrieving apparatus, as well as similar-image retrieving method and program storage media therefor, in which the amount of data for shape comparison can be reduced by digitizing feature quantities of external shape into numerical values while shape comparison can be achieved by simple operations using the digitized feature quantities, and moreover in which retrieval is enabled even for similar images having a rotated or translated external shape or having a scaled-up or scaled-down external shape.

In order to achieve the above-mentioned object, the present invention provides an image processing apparatus for extracting features of an image from digital image data of the image, comprising:

a detection controller for extracting an external shape of an island from an image and detecting coordinates of a pixel string positioned at an edge portion of the external shape; and an extraction controller for extracting, as feature information of the image, coefficients determined by Fourier series expansion of the coordinates of the pixel string detected by the detection controller.

In one embodiment of the invention, the image processing apparatus further comprises a calculation controller for comparing the feature information of the image extracted by the extraction controller with feature information of a specified image and calculating a similarity between the two images.

In one embodiment of the invention, the calculation controller calculates the similarity by multiplying coefficients for selected orders of the Fourier series by respective weights.

In one embodiment of the invention, the image processing apparatus further comprises:

a registration controller for registering in a database the feature information extracted by the extraction controller in association with the image data of the image; and a retrieval controller for retrieving desired image data based on the feature information from among the image data registered in the database by the registration controller.

In one embodiment of the invention, the retrieval controller comprises:

an input device for receiving feature information of an image which serves as a key to retrieval; and a calculation controller for comparing feature information of a plurality of images registered in the database with the feature information received by the input device and calculating similarities between the plurality of images and the key image so that the retrieval controller retrieves image data based on results of the calculation.

The present invention also provides an image processing method for extracting features of an image from digital image data of the image, comprising:

a detection step for extracting an external shape of an island from an image and detecting coordinates of a pixel string positioned at an edge portion of the external shape; and an extraction step for extracting, as feature information of the image, coefficients determined by Fourier series expansion of the coordinates of the pixel string detected by the detection step.

The present invention further provides a computer program product in a memory for executing image processing to extract features of an image from digital image data of the image, comprising:

a detection control for extracting an external shape of an island from an image and detecting coordinates of a pixel string positioned at an edge portion of the external shape; and an extraction control for extracting, as feature information of the image, coefficients determined by Fourier series expansion of the coordinates of the pixel string detected by the detection control.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a flow chart of a shape comparison processing subroutine of FIG. 4;

FIG. 7B is a view showing point strings which are obtained by scanning the labeled pixels of FIG. 7A from left side, lower side, right side and upper side, respectively;

FIG. 8 is a view showing four point strings generated by logically ORing the point strings of the upper side and the left side of FIG. 7B, by logically ORing the point strings of the left side and the lower side, by logically ORing the point strings of the lower side and the right side, and by logically ORing the point strings of the right side and the upper side, respectively;

FIG. 12 is a chart showing coefficients which represent feature quantities of a regular dodecagon;

FIG. 13 is a chart showing feature quantities of a regular hexagon;

FIG. 14 is a chart showing coefficients which represent feature quantities of a regular triangle;

FIG. 15 is a chart showing coefficients which represent feature quantities of "E";

FIG. 16 is a chart showing coefficients which represent feature quantities of "F";

FIG. 17 is a chart showing coefficients which represent feature quantities of "山";

FIG. 18A is a view showing the graphic of regular dodecagon;

FIG. 18B is a view in which the graphics other than the regular dodecagon of FIG. 18A, after the determination of their similarities to the regular dodecagon, are arrayed in the decreasing order of similarity;

FIG. 18C is a view showing the graphic of "E"; and

FIG. 18D is a view in which the graphics other than the graphic of "E" of FIG. 18C, after the determination of their similarities to "E", are arrayed in the decreasing order of similarity.

DETAILED DESCRIPTION OF THE PREFERRED EMBODIMENTS

Hereinbelow, the similar-image retrieving apparatus and the similar-image retrieving method according to the present invention are described in detail by an embodiment thereof illustrated in the accompanying drawings.

Figure 1:
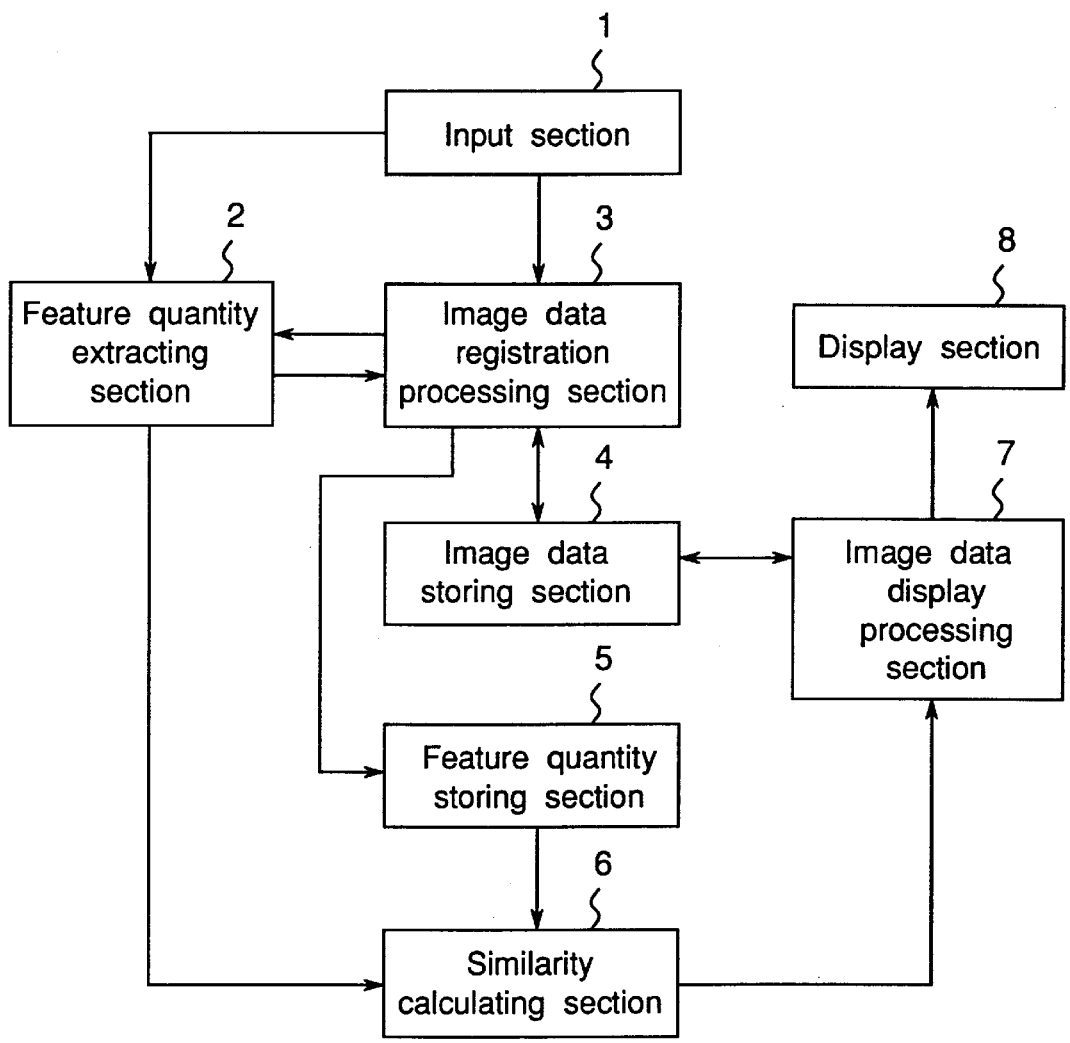
FIG. 1 is a functional block diagram of a similar-image retrieving apparatus according to one embodiment of the present invention.

FIG. 1 is a functional block diagram of a similar-image retrieving apparatus according to one embodiment of the present invention, where reference numeral 1 denotes an input section to which image data, various types of instructions and the like are inputted, and reference numeral 2 denotes a feature quantity extracting section for extracting feature quantities of external shapes of islands in an image based on image data derived from the input section 1 or on image data derived from an image data registration processing section 3. The image data registration processing section 3 is for performing a process of registering the image data derived from the input section 1 and the feature quantities extracted from the feature quantity extracting section 2 in correspondence with each other. Reference numeral 4 denotes an image data storing section for storing image data by the image data registration processing section 3. Reference numeral 5 denotes a feature quantity storing section for storing the feature quantities of external shapes of islands extracted by the image data registration processing section 3. Reference numeral 6 denotes a similarity calculating section for calculating a similarity between a key image as a first image and a comparative image as a second image based on the feature quantities of image data derived from the feature quantity extracting section 2 or on the feature quantities of image data derived from the feature quantity storing section 5. Reference numeral 7 denotes an image data display processing section for performing a process of displaying image data derived from the image data storing section 4 onto a display section 8 based on calculation results derived from the similarity calculating section 6.

Figure 2:
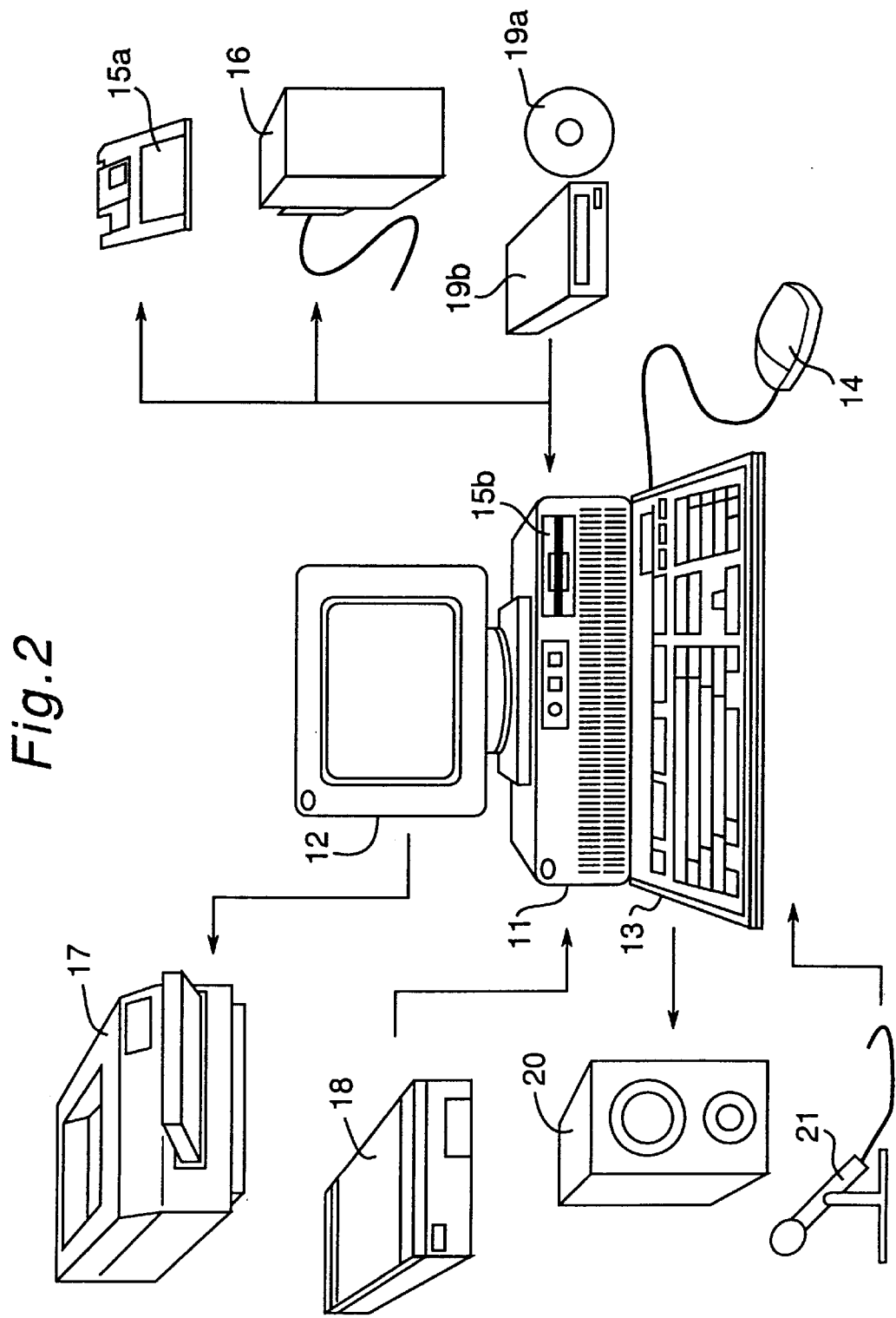
FIG. 2 is a view showing a hardware configuration for implementing the function of FIG. 1.

FIG. 2 is a view showing a hardware configuration for implementing the function of FIG. 1.

The similar-image retrieving apparatus, as shown in FIG. 2, comprises a control unit 11 for controlling the operation of the whole apparatus, a CRT (Cathode-Ray Tube) 12 for displaying images, characters and the like and performing various types of display for operation, a keyboard 13 and a mouse 14 for performing various types of input operations, instruction operations and the like, a floppy disk drive 15b which is built into the control unit 11 and which performs recording and reproduction on a floppy disk 15a that is a data storage medium, a hard disk unit 16, a printer 17 for printing out drawings or the like prepared by image data or image compilation, a scanner 18 for capturing image data, a CD-ROM drive 19b for performing reproduction of a CD (Compact Disk) 19a, a loudspeaker 20 for outputting sounds, and a microphone 21 for inputting sounds. The CRT 12, the keyboard 13, the mouse 14, the hard disk unit 16, the printer 17, the scanner 18, the CD-ROM drive 19b, the loudspeaker 20 and the microphone 21 are connected to the control unit 11.

In the similar-image retrieving apparatus, the input section 1 is implemented by the keyboard 13, the mouse 14, the scanner 18 and the CD-ROM drive 19b, the image data storing section 4 and the feature quantity storing section 5 are implemented by the floppy disk 15a and the hard disk unit 16, the display section 8 is implemented by the CRT 12, and the feature quantity extracting section 2, the image data registration processing section 3 and image data display processing section 7 are implemented by the control unit 11.

Figure 3:
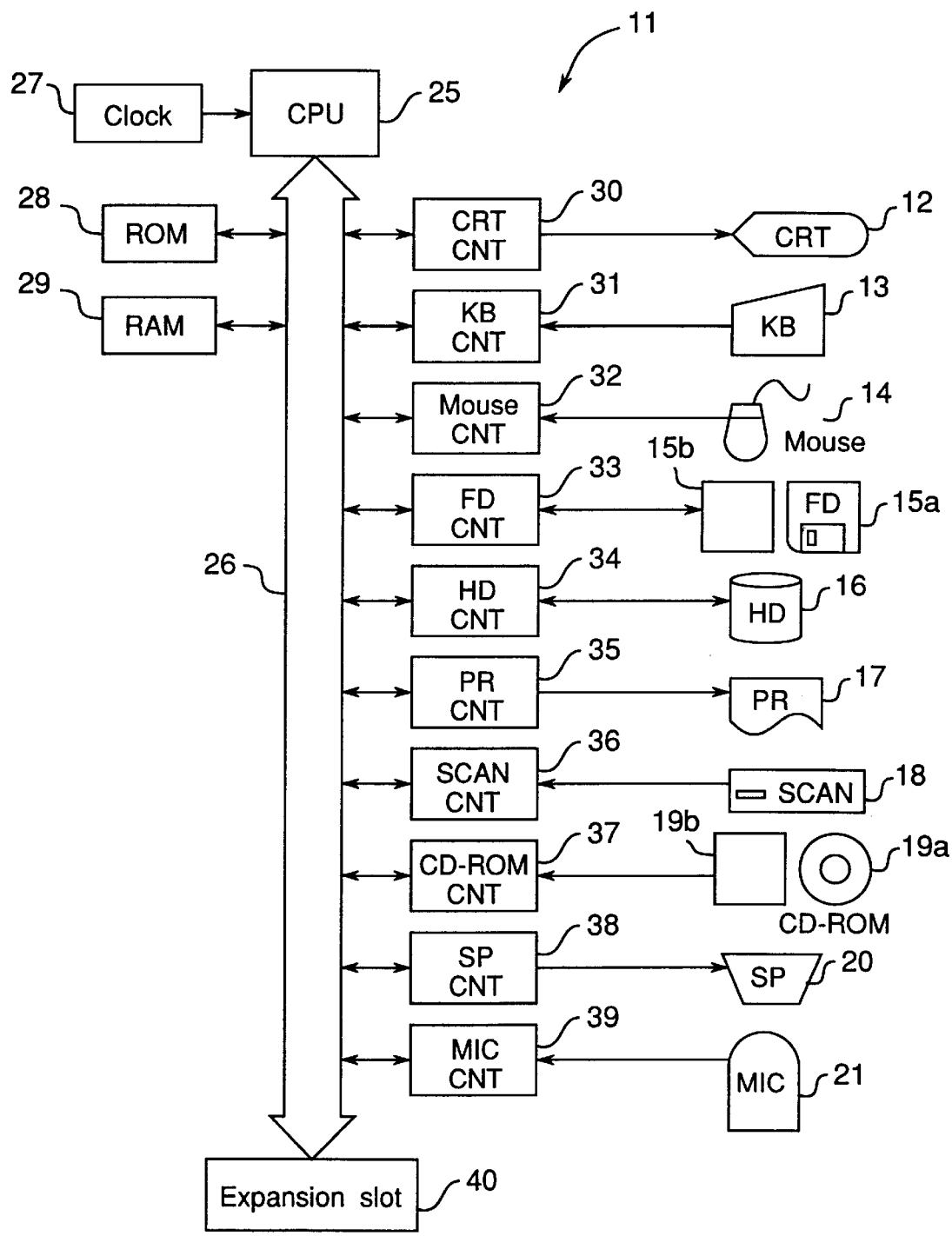
FIG. 3 is a block diagram mainly of a CPU mounted on a control unit of FIG. 2.

FIG. 3 is a block diagram mainly of a CPU (Central Processing Unit) 25 mounted on the control unit 11 of FIG. 2.

The CPU 25 is implemented by, for example, product number i80486DX made by Intel Corporation. To the CPU 25, are connected, via a data bus 26, a ROM (Read Only Memory) 28 in which programs for controlling the whole apparatus are stored, a RAM (Random Access Memory) 29 in which various data and programs are stored, a display control circuit 30 for making images or characters or the like displayed onto the CRT 12, a keyboard control circuit 31 for controlling the transfer of inputs from the keyboard 13, a mouse control circuit 32 for controlling the transfer of inputs from the mouse 14, a floppy disk drive control circuit 33 for controlling the floppy disk drive 15b, a hard disk control circuit 34 for controlling the hard disk unit 16, a printer control circuit 35 for controlling outputs to the printer 17, a scanner control circuit 36 for controlling the scanner 18, a CD-ROM drive control circuit 37 for controlling the CD-ROM drive 19b, a loudspeaker control circuit 38 for controlling the loudspeaker 20, and a microphone control circuit 39 for controlling the microphone 21.

Also, a clock 27 for generating a reference clock necessary to operate the whole apparatus is connected to the CPU 25, and an expansion slot 40 for connecting various types of expansion boards via the data bus 26 is further connected thereto. In addition, a SCSI (Small Computer System Interface) board (not shown) may be connected to the expansion slot 40 so as to allow the floppy disk drive 15b, the hard disk unit 16, the scanner 18, the CD-ROM drive 19b and the like to be connected.

Figure 4:
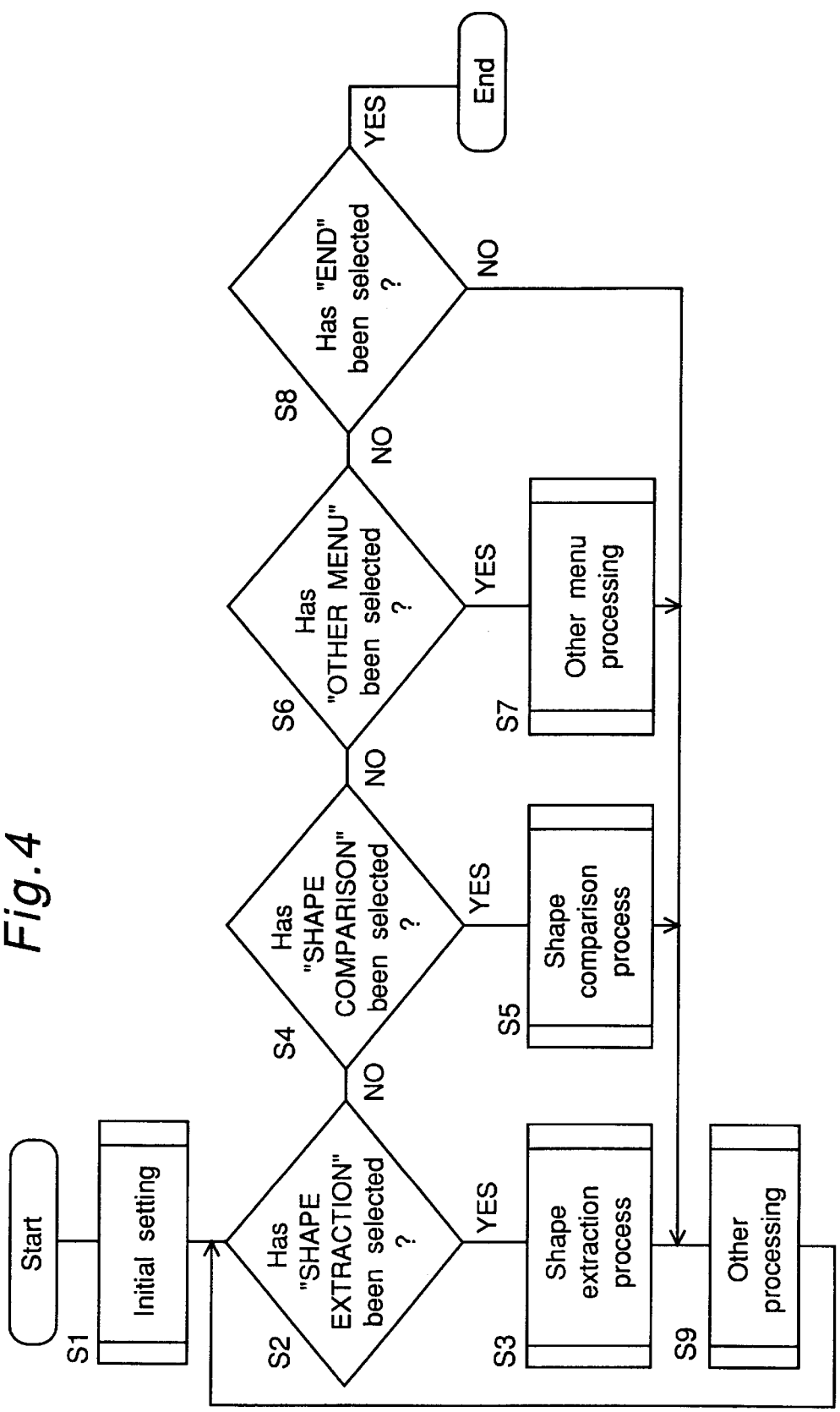
FIG. 4 is a flow chart for explaining a basic processing operation of the CPU of FIG. 3.
Figure 5:
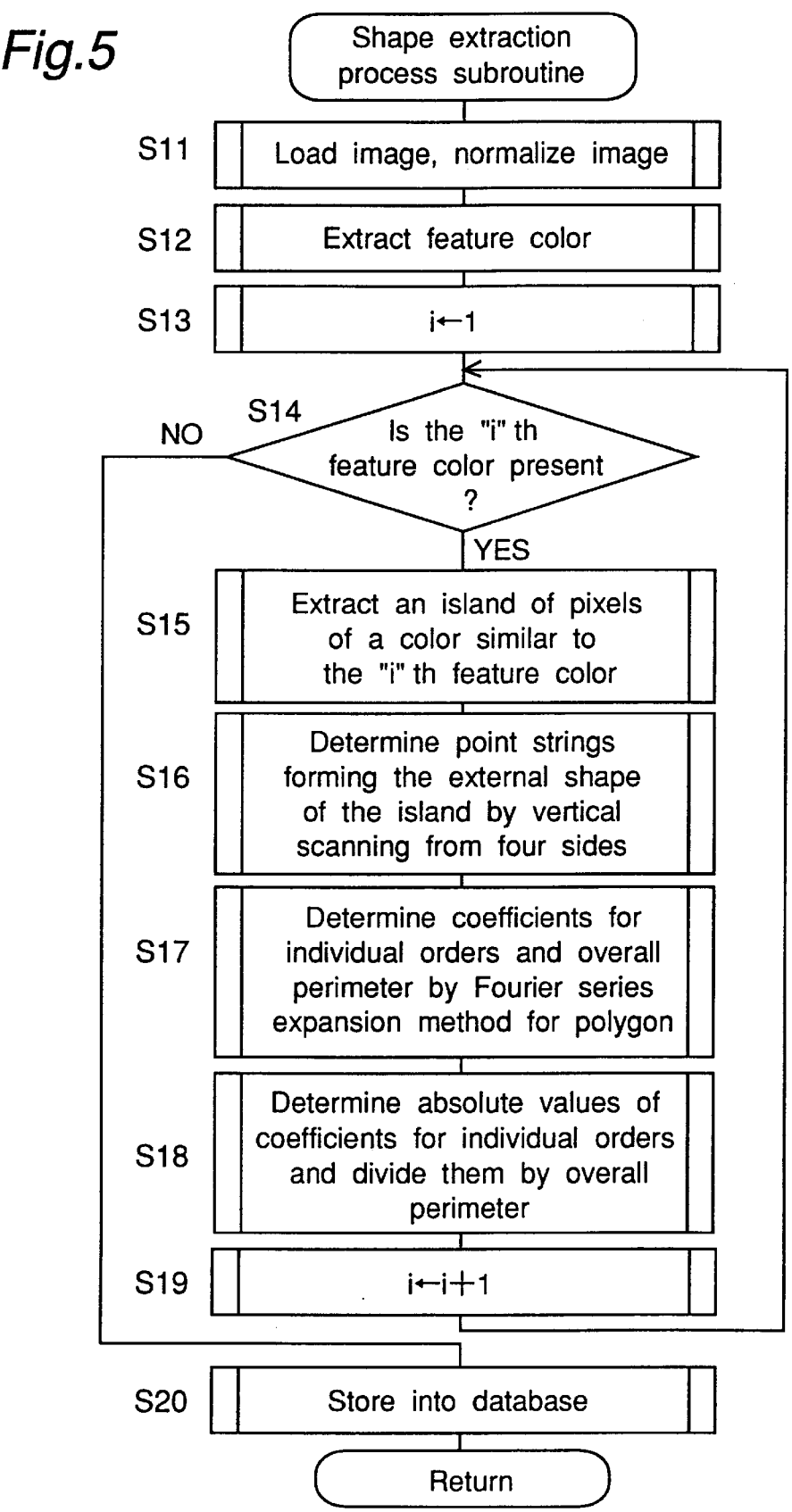
FIG. 5 is a flow chart of a shape extraction processing subroutine of FIG. 4.

The similar-image retrieving apparatus having the above constitution operates according to flow charts of FIGS. 4, 5 and 6. FIG. 4 is a flow chart showing the main routine of the program for the similar-image retrieving apparatus. FIG. 5 is a flow chart of the shape extraction process subroutine shown in FIG. 4, and FIG. 6 is a flow chart of the shape comparison process subroutine shown in FIG. 4.

Referring to the main routine of FIG. 4, first, when the program is started up, initialization of flags necessary for later-described processes, display of an initial screen, and the like are executed at step S1.

Next, the program goes to step S2, where it is decided whether or not "SHAPE EXTRACTION" in the job menu has been selected on the initial screen displayed on the display section 8. If it is decided that "SHAPE EXTRACTION" has been selected, the program goes to step S3, where a shape extraction process is carried out, the program going to step S9. Meanwhile, if it is decided at step S2 that "SHAPE EXTRACTION" has not been selected, the program goes to step S4.

Next, at step S4, it is decided whether or not "SHAPE COMPARISON" in the job menu has been selected. If it is decided that "SHAPE COMPARISON" has been selected, the program goes to step S5, where a shape comparison process is carried out, the program going to step S9. Meanwhile, if it is decided at step S4 that "SHAPE COMPARISON" has not been selected, the program goes to step S6.

Next, at step S6, it is decided whether or not "OTHER MENU" has been selected. If it is decided that "OTHER MENU" has been selected, the program goes to step S7, where other menu processing is carried out, the program going to step S9. Meanwhile, if it is decided at step S6 that "OTHER MENU" has not been selected, the program goes to step S8. Then, at step S8, it is decided whether or not "END" has been selected. If it is decided that "END" has been selected, this process is ended. Meanwhile, if it is decided at step S8 that "END" has not been selected, then the program goes to step S9, where other processing is carried out, and then the program returns to step S2.

Now the shape extraction process of step S3 and the shape comparison process of step S4 are explained. It is noted that the other steps have no direct relations to the present invention and so their detailed description is omitted.

When the menu of shape information extraction is selected in the main routine of FIG. 4, a shape extraction process subroutine shown in FIG. 5 is executed by the CPU 25.

First, at step S1, image data is acquired from a storage medium (floppy disk 15a or hard disk unit 16) of a database, a file system or the like, and then normalized. The normalization in this case refers to image processing that an image is scaled down to a specified size for reduction in image processing time and reduction in noise, where the image is scaled down so as to be accommodated in a size of 90×90 pixels while its aspect ratio is maintained.

Next, the program goes to step S12, where feature color extraction is carried out. That is, whereas the shape to be extracted from the image herein refers to a shape made up of a single color that is impressive of the whole image, the shape is subjected to image processing so that the feature color is extracted. The method for extracting the feature color may be, for example, that a predetermined color is found out of the image and, if present, extracted as the feature color, or that a color being high in chroma and occupying major area is found out and taken as the feature color. The feature color is extracted generally in some plurality from one image.

Subsequently, the program goes to step S13, where 1 is substituted into a variable counter i for the place in order of feature colors.

Subsequently, the program goes to step S14, where it is decided whether or not the "i"th feature color is present. If it is decided that the "i"th feature color is present, the program goes to step S15, where islands of pixels of a color similar to the "i"th feature color are extracted and then labeled so that an island of the feature color (a group of pixels formed of labeled pixels which are connected to one another). In this process, when a plurality of divisional islands are involved, the following decision criteria as an example are used for the selection of an island effective for the shape extraction:

① an island having the largest area;
② an island having the highest density of pixels occupied by the feature color in the island;
③ an island determined comprehensively from 1̂ and 2̂;
④ an island having a more than specified value of area; and
⑤ an island having a more than specified value of density of pixels occupied by the feature color in the island.

In these cases, a plurality of islands may be extracted. When a plurality of islands are extracted, the steps S16 to S18 are repeated according to the number of islands.

Subsequently, the program goes to step S16, where the island is scanned vertically from four sides so that point strings forming the external shape of the island are determined.

Figure 7A:
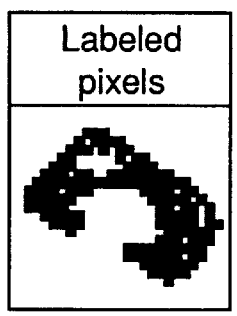
FIG. 7A is a view showing labeled pixels.

For example, in the case of labeled pixels as shown in FIG. 7A, the labeled pixels (a group of labeled pixels) are scanned counterclockwise along the four sides (left, down, right, up) in turn in a direction perpendicular to the side and toward its opposite side, where a point string obtained by seriating coordinate values of the labeled pixels that are first encountered in each scanning process is taken as a point string L scanned from the left side, a point string B scanned from the lower side, a point string R scanned from the right side and a point string U scanned from the upper side, as shown in FIG. 7B. In this case, let the coordinate system be that the horizontal x-coordinate value increases rightward in the figure, and that the vertical y-coordinate value increases downward in the figure. Then, minimum and maximum values [Xmin, Xmax] of the x-coordinate values as well as minimum and maximum values [Ymin, Ymax] of the y-coordinate values of the labeled pixels are determined from the point string L, the point string B, the point string R and the point string U.

Next, a logical OR-operation is performed between a point string ranging from the point having the minimum x-coordinate value out of the points having the Ymin in the point string T to the end point, and a point string ranging from the start point of the point string L to the point having the maximum y-coordinate value out of the points having the Xmin, by which a point string TL shown in FIG. 8 is determined. Subsequently, a logical OR-operation is performed between a point string ranging from the point having the maximum y-coordinate value out of the points having the Xmin in the point string L to the end point, and a point string ranging from the start point of the point string B to the point having the maximum x-coordinate value out of the points having the Ymax, by which a point string LB shown in FIG. 8 is determined. Subsequently, a logical OR-operation is performed between a point string ranging from the point having the maximum x-coordinate value out of the points having the Ymax in the point string B to the end point, and a point string ranging from the start point of the point string R to the point having the minimum y-coordinate value out of the points having the Xmax, by which a point string BR shown in FIG. 8 is determined.

Subsequently, a logical OR-operation is performed between a point string ranging from the point having the minimum y-coordinate value out of the points having the Xmax in the point string R to the end point, and a point string ranging from the start point of the point string T to the point having the maximum y-coordinate value out of the points having the Ymin, by which a point string RT shown in FIG. 8 is determined.

Figure 9A:
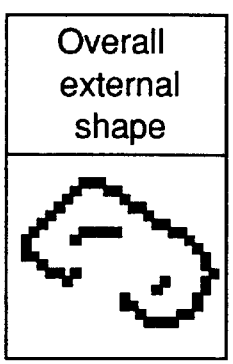
FIG. 9A is a view showing a point string of the whole external shape generated from the four point strings shown in FIG. 8.
Figure 9B:
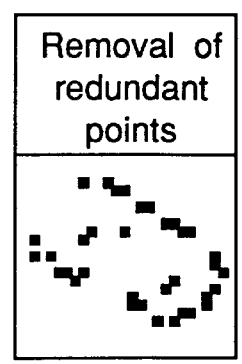
FIG. 9B is a view showing a point string in which redundant points of the point string of FIG. 9A have been removed.
Figure 10:
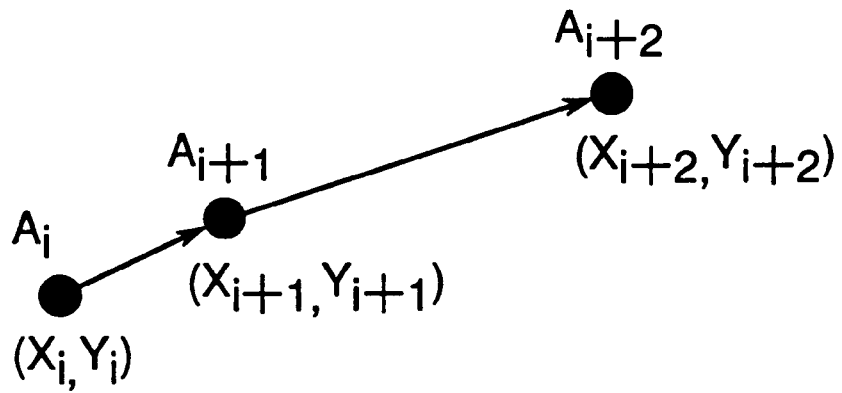
FIG. 10 is a view for explaining the method for removing the redundant points in FIG. 9B.

The point string TL, the point string LB, the point string BR and the point string RT determined in this way are coupled to one another in turn, so that a point string A of edge pixels in the external shape of the island of the labeled pixels is determined as shown in FIG. 9A.

Next, intermediate points which are neighboring points present on the same straight line in the point string A are removed from the point string A as redundant points, by which a point string B from which redundant points have been removed is determined.

That is, assuming that three neighboring points $A_i$, $A_{i+1}$, $A_{i+2}$ of the point string A have coordinates $(X_i, Y_i)$, $(X_{i+1}, Y_{i+1})$, $(X_{i+2}, Y_{i+2})$, respectively, then a point $A_{i+1}$ satisfying that $$X_{i+2}-X_{i+1}=X_{i+1}-X_i$$

and that $$Y_{i+2}-Y_{i+1}=Y_{i+1}-Y_i$$

is removed as a redundant point.

Otherwise, on condition that two vectors $V_1$, $V_2$ are expressed from the points $A_i$, $A_{i+1}$, $A_{i+2}$ as $$V_1=A_{i+1}-A_i$$

$$V_2=A_{i+2}-A_{i+1},$$

if the condition that $$1.0-(V_1\cdot V_2)/(|V_1\|V_2|)>\epsilon$$

is satisfied, i.e., if the angle formed by the two vectors $V_1$, $V_2$ is less than an angle $\epsilon$, then the point $A_{i+1}$ is removed as a redundant point.

Next, the program goes to step S17, where coefficients for the orders and the overall perimeter are determined by Fourier series expansion method for polygons.

More specifically, the point string B determined at step S16 is a point string which runs around counterclockwise on the perimeter of the labeled island and which is a polygon approximation of the external shape to be extracted, where the values of coefficients for the individual orders as well as the overall length of the point string B are determined by Fourier series expansion method with respect to the point string B. In this case, up to the higher order the coefficients are determined by the Fourier series expansion method, the better the precision of the results is. However, because the precision is more or less lost in the process of scaling down and normalizing the image and in the process of determining the point strings of the shape from the labeled pixels, the calculation is discontinued at an appropriate order. According to experimental results by the present applicant, successful results of shape comparison were obtained by determining the coefficients for the 1st to 10th orders or 1st to 20th orders or so for ordinary similar-image retrieval.

Subsequently, the program goes to step S18, where the absolute values of the coefficients for the individual orders determined at step S17 are determined and the absolute values of the coefficients are divided by the overall perimeter. Determining the absolute values of the coefficients makes it possible to execute the retrieval for rotated graphics, and determining the values obtained by dividing the absolute values of the coefficients by the overall perimeter makes it possible to execute the retrieval for similar graphics. In addition, in this case, excluding the coefficient for the 0th order from the feature quantities makes it possible to execute the retrieval also for moved graphics.

Subsequently, the program goes to step S19, where the variable counter i that represents the number of feature colors is incremented, and then the program returns to step S14.

Then, if it is decided at step S14 that the "i"th feature color is absent, the program goes to step S20, where extracted feature colors and feature quantities of the shape are stored in the database (floppy disk 15a or hard disk unit 16), the program terminating this shape extraction process subroutine and returns to the main routine of FIG. 4.

By this shape extraction process, the coefficients of a Fourier series representing the feature quantities of the shape are generated from the target image and stored in the feature quantity storing section 5.

Now, the Fourier series expansion method to be used in the step S17 of FIG. 5 is explained in detail.

For example, if a position coordinate of a point distant from the start point by 1 along the boundary is expressed as u(l), the u(l) can be expressed on the complex plane as $$u(l)=x(l)+iy(l) \tag{1}$$

The position coordinate u(l) being a complex function, if the position coordinate u(l) is taken as the periodic function of a period L, the position coordinate u(l) can be expressed in the complex form by Fourier series expansion as $$u(l) = \sum_{k=-\infty}^{\infty} a_k e^{ik\frac{2\pi}{L}l} \tag{2}$$

where the coefficients $a_k$ for the individual orders are $$a_k = \int_0^L u(l) e^{-i\frac{2\pi}{L}kl} dl \tag{3}$$

In this case, the external shape of the island obtained from the image data results in a polygon.

Figure 11:
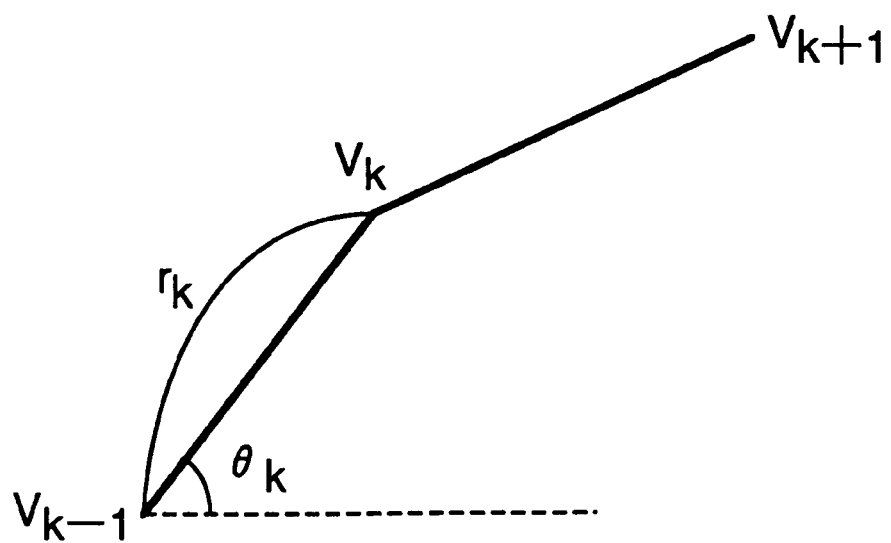
FIG. 11 is a view for explaining the Fourier descriptor for a polygon.

Therefore, as shown in FIG. 11, assuming that, with respect to neighboring three vertices $V_{k-1}$, $V_k$, $V_{k+1}$, of the polygon, an angle formed by the side between the vertex $V_{k-1}$ and the vertex $V_k$ and the horizontal reference line is $\theta_k$, and that the distance between the vertex $V_{k-1}$ and the vertex $V_k$, i.e., the side length is $r_k$, and moreover assuming that $$\left.\begin{array}{l} l_k = \sum_{i=1}^{k} |V_i - V_{i-1}| = \sum_{i=1}^{k} r_i \quad (k \neq 0) \\ l_o = 0 \\ b_k = \dfrac{\overrightarrow{V_{k+1} - V_k}}{V_{k+1} - V_K} = \dfrac{\overrightarrow{r_{k+1}}}{r_{k+1}} = e^{i\theta_{k+1}} \\ l_m = L \text{ (perimeter)} \end{array}\right\} \tag{4}$$

then the above function u(l) results in $$u(l) = V_{m-1} + (l - l_{m-1}) e^{i\theta_m} \left( \sum_{i=1}^{m-1} r_i \leq l < \sum_{i=1}^{m} r_i \right) \tag{5}$$

Substituting Equation (5) into Equation (3) causes the coefficient $a_n$ for the "n"th order, where n≠0, to result in $$a_n = \dfrac{\left\{ \int_0^{r_1} (V_0 + (l - i_0) e^{i\theta_1}) e^{i\frac{2\pi}{L}nl} dl + \cdots + \int_{r_1 + \cdots + r_{m-1}}^{r_1 + \cdots + r_m} (V_{m-1} + (l - l_{m-1}) e^{i\theta_m}) e^{-i2\frac{\pi}{L}dl} \right\} \Big/ L}{} \tag{6}$$

$$= \dfrac{\sum_{k=1}^{m} (b_{k-1} - b_k) e^{-in\frac{2\pi}{L}l_k}}{L\left(\dfrac{2\pi n}{L}\right)^2}$$

Thus, the coefficient $a_0$ for the order number n=0, i.e, the 0th order becomes a value relating to the position of a graphic independently of shape.

Also, when the menu of shape comparison process is selected in the main routine of FIG. 4, the shape comparison process subroutine shown in FIG. 6 is executed by the CPU 25.

Here is described a process that a key-role image (hereinafter, referred to as a key image) as a first image is specified by the user, a similarity between the shape feature quantity of the key image and the shape feature quantity of a retrieval-target comparative image as a second image is calculated and then top s images of the highest similarities are sorted and displayed in a descending order of similarity.

Referring to FIG. 6, first at step S21, the feature quantity of the shape of the key image specified by the user is loaded from the database.

Next, at step S22, the array of images up to the top s places of similarity are emptied. Into this array, information on image data is substituted at subsequent steps.

Subsequently, the program goes to step S23, where the record pointer of the image database targeted for retrieval is moved to the top.

Subsequently, the program goes to step S24, where the feature quantity of the shape of an image pointed by the record pointer is loaded from the database (feature quantity storing section 5).

Subsequently, the program goes to step S25, where a similarity between the feature quantity of the shape of the key image and the feature quantity of the shape of the retrieval target is calculated.

Subsequently, the program goes to step S26, where it is decided whether or not the similarity calculated at step S25 falls within the top s places. If it is decided that the similarity falls within the top s places, the program goes to step S27. On the other hand, if it is decided that the similarity does not fall within the top s places, the step S27 is skipped. Whereas it has been practiced in the conventional similar-image retrieving apparatus that delimitation for display or non-display is set depending on whether or not the key has hit, this similar-image retrieving apparatus sorts and displays top several places of images by similarity so that higher-similarity images are preferentially displayed. It is noted here that a similarity of 0 means that images are of the same, a similarity of 1 means that there is no similarity between images, where the similarity increases with increasing proximity to 0 while the similarity decreases with increasing proximity to 1. Also, the user may specify how many top places of images are displayed.

Subsequently, images are added to the array of the top s places at step S27. That is, when the array of up to the top s places has already been filled, data of the lowest similarity is deleted from the array and the similarity determined this time is added to the array.

Subsequently, the program goes to step S28, where the record pointer is incremented by 1.

Then, the program goes to step S29, where it is decided whether or not any record of the next retrieval-target image is present. If it is decided that any record of the next retrieval-target image is present, the program returns to step S24, where the steps S24 to S29 are repeated. Meanwhile, if it is decided at step S29 that no record of the next retrieval-target image is present, the program goes to step S30.

Subsequently, the similarities within the array of up to the top s places are sorted at step S31.

Then, the program goes to step S31, where retrieval results are displayed in a sorted order. That is, image data of the top s places are displayed by the CRT 12 in the descending order of similarity. After that, this shape comparison process subroutine is ended and the program returns to the main routine of FIG. 4.

The description up to here has been made on a case where one shape feature quantity is present for the key image while one shape feature quantity is also present for the comparison-target image. In a case where a plurality of shape feature quantities are present for the key image while no shape feature is present or a plurality of shape feature quantities are present for the comparison-target image, the shape comparison is carried out by defining the similarity as follows:

First, the similarity between one shape feature quantity of the key image and one shape feature quantity of the comparative image is determined by the following equation:

$$D = \sum_{i=-10}^{10} W_i(a_i - a'_i)^2 \quad (7)$$

where $a_i$ is the coefficient for the "i"th order of the key image and $a_i'$ is the coefficient for the "i"th order of the comparative image, and where $W_i$ satisfies that $$W_i = \frac{|k|^k}{W_{All}} \quad \text{(where } k \text{ is a constant)} \quad (8)$$

$$W_{all} = pow\left(\prod_{i=1}^{10} |k|^k, 0.1\right) \text{ and} \quad (9)$$

Whereas it is assumed that k=0.0 for ordinary comparison, it is assumed that k=−0.5 for giving importance to the feature quantities represented by coefficients for lower orders and that k=0.5 for giving importance to the feature quantities represented by coefficients for higher orders. In addition, $W_{ALL}$ is normalized by determining the geometrical mean of the coefficients prior to the normalization in order to avoid variations in the numerical value of similarity depending on the value of k. An example of the weight $W_i$ is shown in Table 1.

TABLE 1

| k | Example of weight value (in the sequence of 1st-, 2nd-, ... orders) | | | | | | | | | |
|---|---|---|---|---|---|---|---|---|---|---|
| −0.5 | 2.13 | 1.50 | 1.23 | 1.06 | 0.95 | 0.87 | 0.80 | 0.75 | 0.71 | 0.67 |
| 0.0 | 1.00 | 1.00 | 1.00 | 1.00 | 1.00 | 1.00 | 1.00 | 1.00 | 1.00 | 1.00 |
| 0.5 | 0.47 | 0.66 | 0.81 | 0.94 | 1.05 | 1.15 | 1.24 | 1.33 | 1.41 | 1.49 |

Then, if N shape feature quantities are present in the key image and if M shape feature quantities are present also in the comparison-target image, the comparison operation by Equation (7) is executed to N×M times, by which a similarity D can be determined with the top J shape feature quantities of the highest similarities as $$D=(r_1D_1+r_2D_2+ \ldots +r_JD_J)/J \quad (10)$$

where $r_1, r_2, \ldots, r_J$ are weights obtained from the ratios of feature colors to the screen, and the $r_1, r_2, \ldots, r_J$ are all assumed as 1 in this embodiment.

The following explanation is made about results obtained through the steps of determining shape feature quantities of a regular dodecagon, a regular hexagon, a regular triangle, an "E" shape, an "F" shape and a "山" (a kanji, or Chinese character, meaning mountain) shape and then, based on the determined feature quantities, determining similarities between one arbitrary key image and the other comparative images in the similar-image retrieving apparatus as described above. It is noted that FIGS. 12 to 17 show the feature quantities represented by coefficients for the 1st to 10th positive orders and negative orders as to the regular dodecagon, the regular hexagon, the regular triangle, the "E" shape, the "F" shape and the "山" shape.

For example, based on the feature quantities of FIGS. 12 to 17, similarities between the regular dodecagon and the other shapes can be determined as D (regular dodecagon, regular hexagon)=0.00865
D (regular dodecagon, regular triangle)=0.04309
D (regular dodecagon, "E" shape)=15.127
D (regular dodecagon, "F" shape)=12.687
D (regular dodecagon, "山" shape)=12.034 where these shapes can be ranked according to the similarity to the regular dodecagon (shown in FIG. 18A) as, in a decreasing order of similarity, the regular hexagon, the regular triangle, the "山" shape, the "F" shape and the "E" shape, from left to right in the figure (shown in FIG. 18B). Also, based on the feature quantities of FIGS. 12 to 17, the similarities between the "E" shape and the other shapes can be determined as D ("E" shape, regular dodecagon)=0.1230
D ("E" shape, regular hexagon)=0.1183
D ("E" shape, regular triangle)=0.1033
D ("E" shape, "F" shape)=0.03059
D ("E" shape, "山" shape)=0.02517 where these shapes can be ranked according to the similarity to the "E" shape (shown in FIG. 18C) as, in a decreasing order of similarity, the "山" shape, the "F" shape, the regular triangle, the regular hexagon and the regular dodecagon, from left to right in the figure (shown in FIG. 18D). Like this, it can be understood that the similarity in each case analogizes to the way of similarity in which man senses on graphics.

As shown above, the feature quantity extracting section 2 extracts feature quantities of an image through the steps of extracting an external shape of an island from image data, determining coefficients by Fourier series expansion of point strings of edge pixels of the resulting external shape, and expressing feature quantities by the coefficients, where similarities D between the key image and comparative images are determined by using the above Equations (7), (8), (9) with the coefficients representing the feature quantity of the key image and the coefficients representing the feature quantities of the comparative images extracted in the above way. That is, the feature quantities of the key image and the comparative images are extracted, respectively, and the feature quantities of the individual images are digitized into numerical values with the coefficients determined by Fourier series expansion, where shape comparison is executed based on the numerical data representing the feature quantities of the individual images. Thus, the amount of data involved can be reduced and therefore operation can be sped up faster than in the shape comparison with image data involving large amounts of data, so that a comparison operation of practical level can be achieved. Further, the retrieval of similar images is enabled without requiring the user to input the key such as a key word for the retrieval of similar images, thus eliminating the inconvenience of inputting the key such as a key word.

Moreover, the shape comparison is enabled also for rotated images through the steps of taking absolute values of coefficients representing feature quantities of the key image and comparative images, calculating similarities D between the key image and the comparative images by the similarity calculating section 6 based on the feature quantities of the key image and the comparative images represented by the absolute values of those coefficients. The shape comparison is enabled also for rotated images through the steps of removing the 0th order out of the coefficients representing the feature quantities of the key image and the comparative images, and calculating similarities D between the key image and the comparative images by the similarity calculating section 6 based on the feature quantities from which the 0th order has been removed. Further, the shape comparison is enabled also for similar images through the steps of dividing the values of the coefficients representing the feature quantities of the key image and the comparative images by the overall perimeter of the external shape of each island, and calculating similarities between the first image and the second image by the similarity calculating section 6 based on the feature quantities represented by the result values of dividing the coefficients by the overall perimeter. Accordingly, the retrieval is enabled for similar images each having a rotated or translated external shape, while the retrieval is enabled also for similar images each having a similar external shape.

Furthermore, outlines of graphics (overall shape such as circular or triangular shape) are compared by multiplying, by larger weights, coefficients for lower orders out of the coefficients representing the feature quantities of the key image and the comparative images, respectively, and by multiplying coefficients for higher orders by smaller weights, respectively, while details of the external shape (e.g., state of fine pits and projections on the periphery) are compared by multiplying, by larger weights, coefficients for higher orders out of the coefficients representing the feature quantities of the key image and the comparative images, respectively, and by multiplying coefficients for lower orders by smaller weights, respectively. Accordingly, a parameter for comparison can be set by setting weights for coefficients representing the feature quantities of the key image and the comparative images, making it possible to freely set whether the comparison is executed with importance placed on the outline of a shape or with importance placed on details of a shape.

In the above embodiment, a similarity between key image and comparative image has been determined by using a plurality of coefficients that are determined by Fourier series expansion and that represent the feature quantities of an image extracted by the feature quantity extracting section 2. Otherwise, the similarity may also be determined by using one coefficient. Also, whereas the sum of squares of differences between the coefficients for the same order has been determined as the similarity, the way to determine the similarity is not limited to this. For example, it may be implemented by comparing spatial distances by determining the square root of the sum of squares of differences between the coefficients for the same order, and any other method, whichever it involves comparison of coefficients of Fourier series, may be used to determine the similarity.

In the above embodiment, the image data storing section 4 has been implemented by the floppy disk 15a and the hard disk unit 16. Otherwise, the image data storing section 4 may be another information storage device such as a magneto-optical disk unit. Also, whereas the scanner 18, the CD-ROM drive 19b have been used as the input section 1, other input devices such as a still video camera or a digital camera may be used. Whereas the printer 17 has been used as the output device, other output devices such as a digital copying machine may also be used.

Further, the above embodiment has been described about a similar-image retrieving apparatus in which the programs for controlling the whole control unit 11 are stored in the ROM 28. However, it is also possible that the programs according to the present invention are partly or entirely stored in a program storage medium such as floppy disks preliminarily and, as required, read to equipment, such as a personal computer, and executed.

Furthermore, extracted shapes have been compared in the shape comparison process by calculating the similarities only in shape, regardless of the feature colors of the extracted shapes in the above embodiment. Otherwise, the shape comparison may also be done by calculating the similarities of external shapes for individual feature colors, respectively, with respect to the shapes extracted for the individual colors.

The Invention being thus described, it will be obvious that the same may be obvious that the same may be varied in many ways. Such variations are not be regarded as a departure form the sprit and scope of the invention, and all such modifications as would be obvious to one skilled in the art are intended to be included within the scope of the following claims.

What is claimed is:

1. An image processing apparatus for extracting features of an image from digital image data of the image, comprising:

a detection controller for extracting an external shape of an island from an image and detecting coordinates of a pixel string positioned at an edge portion of the external shape; and an extraction controller for extracting, as feature information of the image, coefficients determined by Fourier series expansion of the coordinates of the pixel string detected by the detection controller.

2. The image processing apparatus according to claim 1, further comprising a calculation controller for comparing the feature information of the image extracted by the extraction controller with feature information of a specified image and calculating a similarity between the two images.

3. The image processing apparatus according to claim 2, wherein the calculation controller calculates the similarity by multiplying coefficients for selected orders of the Fourier series by respective weights.

4. The image processing apparatus according to claim 1, further comprising:

a registration controller for registering in a database the feature information extracted by the extraction controller in association with the image data of the image; and a retrieval controller for retrieving desired image data based on the feature information from among the image data registered in the database by the registration controller.

5. The image processing apparatus according to claim 4, wherein the retrieval controller comprises:

an input device for receiving feature information of an image which serves as a key to retrieval; and a calculation controller for comparing feature information of a plurality of images registered in the database with the feature information received by the input device and calculating similarities between the plurality of images and the key image so that the retrieval controller retrieves image data based on results of the calculation.

6. An image processing method for extracting features of an image from digital image data of the image, comprising:

a detection step for extracting an external shape of an island from an image and detecting coordinates of a pixel string positioned at an edge portion of the external shape; and an extraction step for extracting, as feature information of the image, coefficients determined by Fourier series expansion of the coordinates of the pixel string detected by the detection step.

7. The image processing method according to claim 6, further comprising a calculation step for comparing the feature information of the image extracted by the extraction step with feature information of a specified image and calculating a similarity between the two images.

8. The image processing method according to claim 7, wherein in the circulation step, the similarity is calculated by multiplying coefficients for selected orders of the Fourier series by respective weights.

9. The image processing method according to claim 6, further comprising:

a registration step for registering in a database the feature information extracted by the extraction step in association with the image data of the image; and a retrieval step for retrieving desired image data based on the feature information from among the image data registered in the database by the registration step.

10. The image processing method according to claim 9, wherein the retrieval step comprises:

an input step for receiving feature information of an image which serves as a key to retrieval; and a calculation step for comparing feature information of a plurality of images registered in the database with the feature information received by the input step, calculating similarities between the plurality of images and the key image so that the retrieval step retrieves image data based on results of the calculation.

11. A computer program product in a memory for executing image processing to extract features of an image from digital image data of the image, comprising:

a detection control for extracting an external shape of an island from an image and detecting coordinates of a pixel string positioned at an edge portion of the external shape; and an extraction control for extracting, as feature information of the image, coefficients determined by Fourier series expansion of the coordinates of the pixel string detected by the detection control.

12. The computer program product according to claim 11, further comprising a calculation control for comparing the feature information of the image extracted by the extraction control with feature information of a specified image and calculating a similarity between the two images.

13. The computer program product according to claim 12, wherein the calculation control calculates the similarity by multiplying coefficients for selected orders of the Fourier series by respective weights.

14. The computer program product according to claim 11, further comprising a registration control for registering in a database the feature information extracted by the extraction control in association with image data of the image; and a retrieval control for retrieving desired image data based on the feature information from among the image data registered in the database by the registration control.

15. The computer program product according to claim 14, wherein the retrieval control comprises:

an input device for receiving feature information of an image which serves as a key to retrieval; and a calculation control for comparing feature information of a plurality of images registered in the database with the feature information received by the input device, calculating similarities between the plurality of images and the key image so that the retrieval control retrieves image data based on results of the calculation.

* * * * *